(12) United States Patent
Villani

(10) Patent No.: US 6,583,416 B1
(45) Date of Patent: Jun. 24, 2003

(54) UNCOOLED IR DETECTOR ARRAY HAVING IMPROVED TEMPERATURE STABILITY AND REDUCED FIXED PATTERN NOISE

(75) Inventor: Thomas Stephen Villani, Londonberry, NH (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/711,615

(22) Filed: Nov. 13, 2000

Related U.S. Application Data
(60) Provisional application No. 60/165,620, filed on Nov. 15, 1999.

(51) Int. Cl.[7] .............................. H04N 5/33; G01J 5/22
(52) U.S. Cl. ............. 250/332; 250/339.02; 250/339.04
(58) Field of Search .............................. 250/332, 338.1, 250/338.3, 338.4, 339.02, 339.04

(56) References Cited

U.S. PATENT DOCUMENTS

| | | | |
|---|---|---|---|
| 3,023,398 A | * | 2/1962 | Siegert ........................ 194/239 |
| 5,600,143 A | * | 2/1997 | Roberts et al. ............. 250/332 |
| 5,659,195 A | * | 8/1997 | Kaiser et al. ............... 257/369 |
| 5,844,238 A | | 12/1998 | Sauer et al. |
| 6,043,493 A | * | 3/2000 | Kim et al. ................ 250/338.1 |
| 6,091,050 A | * | 7/2000 | Carr ........................... 219/201 |
| 6,140,646 A | * | 10/2000 | Busta et al. ................ 250/332 |
| 6,167,748 B1 | * | 1/2001 | Britton et al. ................ 422/69 |
| 2001/0040216 A1 | * | 11/2001 | Knuath et al. .............. 250/352 |

FOREIGN PATENT DOCUMENTS

EP          0 788 277 A2          8/1997

* cited by examiner

*Primary Examiner*—Constantine Hannaher
*Assistant Examiner*—Albert Gagliardi
(74) *Attorney, Agent, or Firm*—William J. Burke

(57) ABSTRACT

A infrared radiation detector array for providing an image signal of a scene is provided including a plurality of infrared radiation detectors having infrared radiation responsive elements. Each one of the plurality of infrared radiation detectors provides a proportionate electrical signal in response to infrared radiation of the scene incident thereto. At least one blind infrared radiation detector having a radiation responsive element is provided and shielded from infrared radiation of the scene. The blind infrared radiation detector provides a proportionate electrical signal in response to infrared radiation incident thereto. The blind infrared radiation detector is configured to provide a signal indicating thermal distortion of the infrared radiation detector array.

13 Claims, 4 Drawing Sheets

UNCOOLED IR DETECTOR ARRAY HAVING IMPROVED TEMPERATURE STABILITY AND REDUCED FIXED PATTERN NOISE

CROSS-REFERENCE TO RELATED APPLICATIONS

This application claims the benefit of U.S. Provisional Application No. 60/165,620, filed Nov. 15, 1999, the contents of which are incorporated herein by reference.

BACKGROUND OF THE INVENTION

The invention relates to an un-cooled infrared (IR) detector arrays having improved thermal stability and reduced fixed-pattern noise. More particularly, the invention relates to an IR detector array utilizing the output signals of blind reference detectors for canceling unwanted signal anomalies from the image signal generated by the IR detector array.

Various infrared radiation detectors are available in today's electronics industry. Many techniques for converting infrared radiation to visible images, are also known.

One such radiation detection device is an infrared imaging device based upon photon-to-electron conversion. These devices can be extremely sensitive; however, a parallel process of thermal generation of electrons can produce significant detector noise. Consequently, photoelectric devices need to be cooled for effective use for infrared imaging. This leads to the use of dewars and cooling devices that add significant weight, bulk, and energy consumption to the imager.

Thermal detectors, in contrast to photoelectric detectors, do not need to be cooled since they convert the broadband heat absorbed directly into some measurable signal. A significant gap exists, however, between the performance of the best of the current generation of un-cooled IR imagers and that of cooled sensors. These "un-cooled" detectors are limited by the ability to thermally isolate them from their surroundings, by the amount of noise they introduce in their detection process, and by the readout noise introduced by electronics. With sufficient thermal isolation and reduced sensing noise, the sensitivity of thermal detectors can approach or even exceed that of photoelectric converters without the need for the mass, volume, and power required for cooling.

An exemplary un-cooled thermal detector which would benefit from such noise reduction is the bi-material micro-cantilever device increasingly utilized in the art. These devices bend, or deflect, when infrared radiation is absorbed upon an infrared responsive absorber element. The infrared radiation heats the bi-material section of the micro-cantilever, thereby urging one of the bi-materials to expand at a greater rate than the other bi-material, causing the micro-cantilever to deflect, or bend with respect to the substrate. The corresponding change in capacitance of the cantilever, relative to the substrate, produces a signal that is detected.

The signal is detected by an arrangement of a fixed reference capacitor and the variable cantilever capacitor forming a charge divider which, when sampled forms a voltage that is proportional to the cantilever capacitance. As can be appreciated the signal is susceptible to thermal drift and instabilities, and, since the signal is the result of minute changes of the cantilever temperature, accurate device temperature control is critical.

Accordingly, there is a need for an uncooled IR detector array having improved temperature stability and reduced fixed pattern noise.

SUMMARY OF THE INVENTION

The present invention is embodied in an infrared radiation detector array including a plurality of infrared radiation detectors having infrared radiation responsive elements. Each one of the plurality of infrared radiation detectors provides a proportionate electrical signal in response to infrared radiation incident thereto. A blind infrared radiation detector having a radiation responsive element is provided and shielded from the incident infrared radiation applied to the radiation detector array. The blind infrared radiation detector provides a proportionate electrical signal in response to infrared radiation incident thereto. In this way, the blind infrared radiation detector is configured such that its signal represents thermal distortion of the infrared radiation detector array.

According to one aspect of the invention, at least one blind infrared radiation detector and a scanning shift register provides an image signal of reduced fixed pattern noise and temperature stability. The scanning shift register selects one of the infrared radiation detectors which is read out and used to compensate the image sensing radiation detector.

According to another aspect of the invention, an image signal is provided of reduced fixed pattern noise and temperature stability by a first plurality of infrared sensors arranged in rows and columns. Each one of the plurality of infrared sensors has a deflectable micro-electromechanical infrared responsive element, for providing a proportionate electrical signal in response to infrared radiation incident thereto. A second plurality of blind infrared sensors arranged about a portion of the perimeter of the rows and columns. Each one of the second plurality of infrared sensors has a deflectable micro-electromechanical infrared responsive element. The radiation responsive elements of the second plurality of blind infrared sensors being shielded from incident infrared radiation representing the image for providing a proportionate electrical signal in response to infrared radiation incident thereto.

According to another aspect of the invention, an image signal is provided of reduced fixed pattern noise and temperature stability by the second plurality of blind infrared sensors which are positioned along at least one side perimeter of the rows and columns.

BRIEF DESCRIPTION OF THE SEVERAL VIEWS OF THE DRAWINGS

The foregoing summary as well as the following detailed description of exemplary embodiments of the invention, will be better understood when read in conjunction with the appended drawings. For the purpose of illustrating the invention, there is shown in the drawings several exemplary embodiments of the invention. It should be understood, however, that the invention is not limited to the precise arrangements and instrumentalities shown. In the drawings.

DETAILED DESCRIPTION OF THE INVENTION

Figure 1:
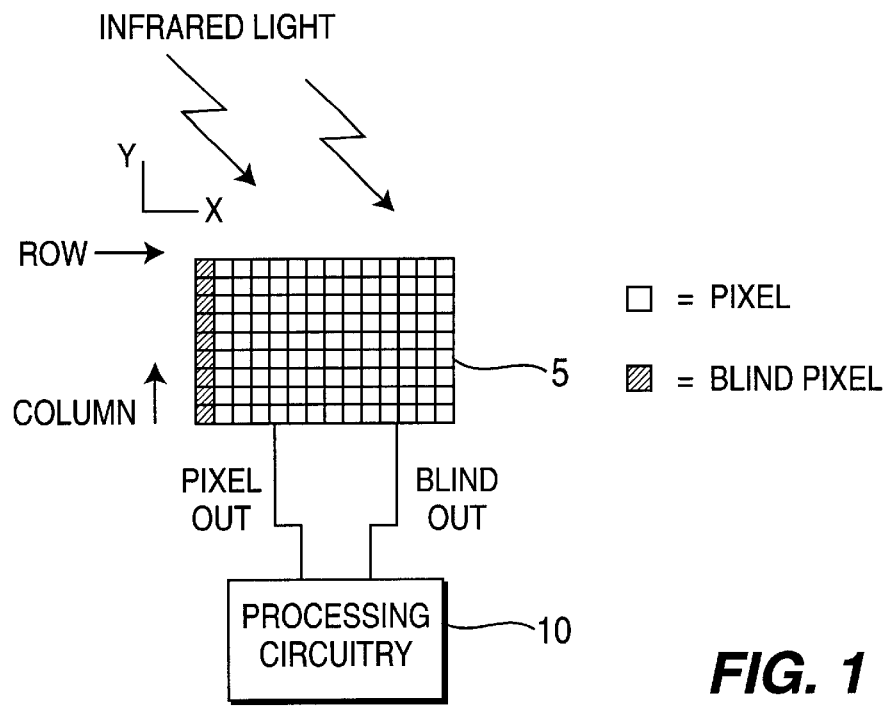
FIG. 1 is a block diagram of an infrared imaging device in accordance with the present invention.

Certain terminology is used herein for convenience only and is not to be taken as a limitation on the present invention. The term "infrared detector" is defined as referring to any sensor device for converting broadband heat into a measurable signal for producing an image, such as microbolometers and microcantilever devices. In the drawings, the same reference numerals are used for designating the same elements throughout the several figures.

The present invention concerns a detector array utilizing the output signals of blind reference detectors for canceling unwanted thermal and fixed pattern signal anomalies from IR detector arrays. The blind reference detectors are duplicates of active IR detectors, however the blind reference detectors are "shielded" or otherwise not permitted to view the IR image signal.

The teachings of the present invention are applicable to any optical detection device, however an exemplary infrared detection device is described for the purpose of illustrating the invention. The exemplary device is a deflectable microelectromechanical (MEM) cantilever device formed of a bi-material on a semiconductor substrate. The bi-material portion of the micro-cantilever device is formed of two different materials sharing a contiguous surface, and having mismatched thermal coefficients of expansion (TCE). Examples of such bi-material MEM micro-cantilever devices and methods for forming the same, are as disclosed in U.S. Pat. No. 5,844,238 issued to Sauer et al.

Detector Array

Referring now particularly to FIG. 1, an infrared radiation detector array 5 is shown in accordance with the present invention. The columns and rows of the array 5 are formed of a plurality of individual infrared radiation detectors or "pixels" of the micro-cantilever type.

Each individual detector includes an infrared radiation responsive member for providing a proportionate electrical signal to processing circuitry 10 in response to infrared radiation incident to the detector array 5. The detectors in FIG. 1 shown cross-hatched, illustrate blind detectors wherein the infrared radiation responsive member of each blind detector is shielded from infrared radiation incident to the array 5 from the scene being imaged.

Figure 1A:
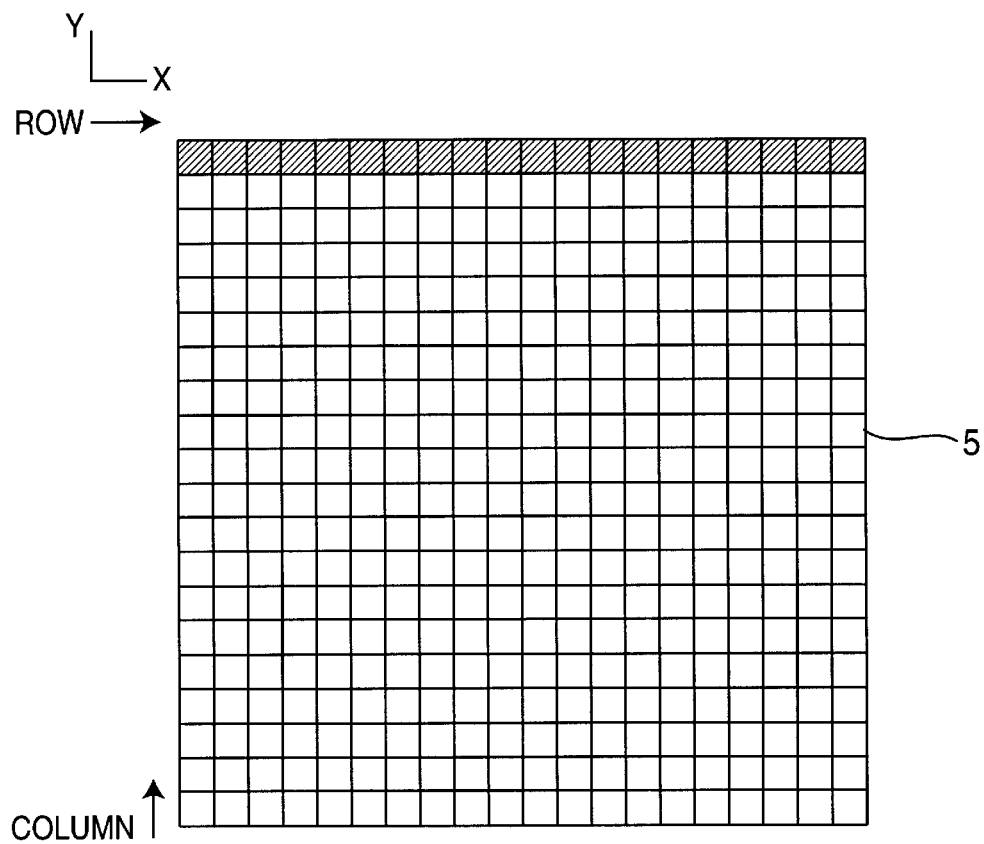
FIG. 1A is a block diagram of a detector array in accordance with an embodiment of the present invention.
Figure 4:
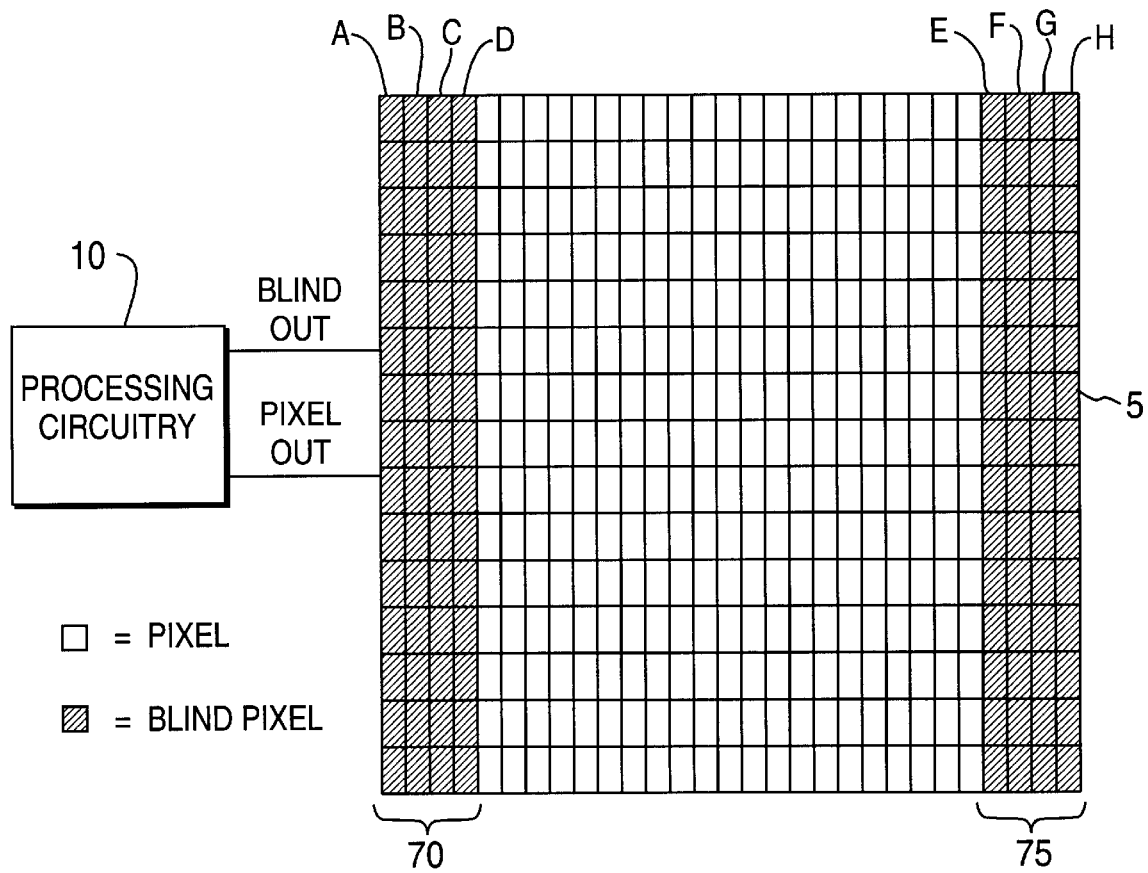
FIG. 4 is a block diagram of an embodiment of an infrared imaging device in accordance with the present invention.

While the blind pixels are shown in a single column along the periphery of the display, those skilled in the art recognize that positioning of the blind pixels is not limited to the specific arrangement shown, and that alternative arrangements, such as that shown in FIG. 4 are within the scope of the invention. For example, FIG. 1A shows an alternative array 5 wherein the blind pixels are shown along a single row along the periphery of the array. Moreover, a single blind pixel may be utilized for providing a single reference signal for the entire array 5.

The electrical signals of the array 5 are provided to signal processing circuitry 10 for generating an image signal. The processing circuitry 10 may be included within the detector array 5 or outside of the array (i.e., off chip). The active pixels provide proportionate electrical signals in response to infrared radiation incident thereto represented by the signal line PIXEL OUT in FIG. 1. The blind pixels provide signals indicating thermal distortion of the infrared radiation detectors represented by the signal line BLIND OUT in FIG. 1.

Figure 2:
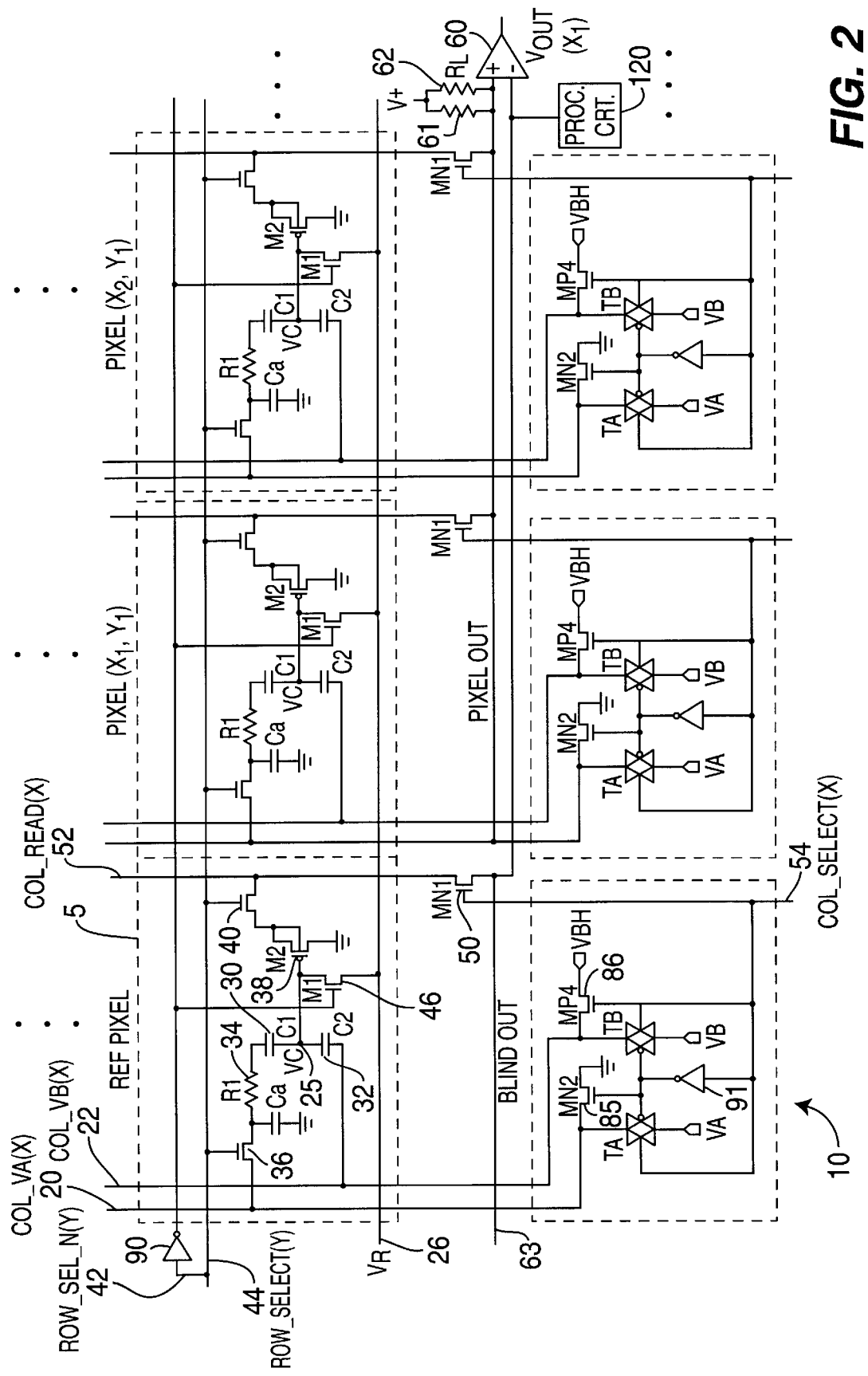
FIG. 2 is a circuit diagram of an exemplary embodiment of a detector array processing circuit according to the present invention.

Referring now to FIG. 2, an exemplary embodiment of the invention is described. A processing circuitry 10 for an un-cooled IR imager is made up of an array of the exemplary MEM capacitance sensors and blind sensors. The processing circuitry 10 may be fabricated using a standard single-poly double-level-metal CMOS process sequence, on which the capacitance sensor is then formed using planar deposition and etching techniques. Exemplary methods for forming the sensors are disclosed in the above-referenced patent.

Because the sensors are capacitively coupled to the processing circuitry 10, no direct electrical connection is required of the capacitive voltage divider circuit. The capacitive voltage divider circuit includes a compensation capacitor (with approximately the same value as the sensing capacitor) in which the sensor and compensator plates are driven with complementary, bi-polar, high-voltage pulsed bias waveforms for maximizing the signal voltage component and cancel the dc bias components. The capacitive divider is coupled to a low-noise MOS amplifier (e.g., a source follower) located in each pixel of the detector array 5. Horizontal (row) and vertical(column) scanning registers (not shown) of processing circuitry 10 are used to address and read out the signal from each source follower amplifier of the pixels.

The manufacturing technology used for the readout multiplexer of processing circuitry 10 is a standard CMOS 1-$\mu$m integrated circuit technology. The manufacturing technology used for the present invention is standard printed circuit board technology.

Because it is the relative position of the capacitor plates (i.e., MEM sensor) of each pixel that is being sensed and because this measurement is not affected by the readout method, the readout noise may be reduced by performing N read operations on the same pixel. This technique can reduce noise by a factor of $\sqrt{N}$. Tradeoffs exist, however, between resolution, field size and SNR. For example, a small field of the wide field of view used for tracking targets may be read multiple times to increase the local SNR.

Figure 3:
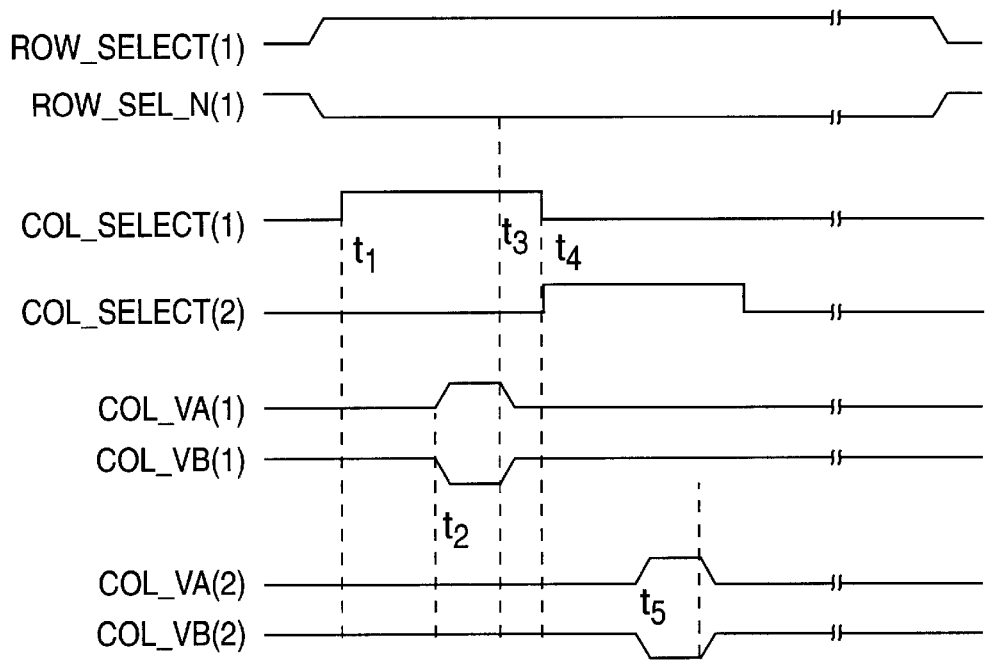
FIG. 3 is a timing diagram of the control signals of the detector array processing circuit of FIG. 2.

The processing circuitry 10 is a CMOS device that is preferably integrated on a silicon substrate supporting the micro-machined IR detector pixels. FIG. 2 shows a schematic diagram of the sensing capacitor C1 and a portion of the exemplary processing circuit 10, FIG. 3 shows an illustrative timing diagram. A current mirror (not shown) provides the pixel load current for the PMOS source follower amplifier 38 located in a selected pixel when the row of pixels is selected.

In the IR pixel, C1 represents the thermally sensitive variable capacitance 30. The top plate of each pixel capacitor 30 is connected to the processing circuit 10 by a thin film metal resistor 34. The other components shown in FIG. 2 are integrated in the silicon substrate. The processing circuit 10 also includes a column driver circuit used to multiplex the common signals $V_A$ and $V_B$ onto one column. This circuit generates the signals COL_VA(X) 20 and COL_VB(X) 22 under the control of the output COL_SELECT(X) 54 which is derived from a conventional horizontal scanning CMOS shift register (not shown). The ROW_SELECT(Y) line 44 is generated by a conventional vertical scanning CMOS shift register (not shown). This signal is inverted to generate the ROW_SEL_N(Y) signal 42 so that the pixels in unselected rows are always in a state with the sense node $V_G$ 25 clamped to a reset potential $V_R$ 26 which is close to ground potential. The COL_READ(X) line 52 is a vertical signal line which is multiplexed to a common signal bus via an NMOS transistor 50 and is further buffered by signal processing circuit 120 which preferably includes a PMOS source follower (not shown) for providing an analog signal to a correlated double sampling (CDS) circuit (not shown).

In an exemplary embodiment, a conventional differential amplifier 60 is provided with bias resistor 61 and load resistor 62. The differential amplifier 60 receives the output signal of the blind pixels along the BLIND OUT BUS 63 for canceling the output of the blind pixel of each row with respect to the active pixel signals of each row of the array. In this way, the differential amplifier 60 detects the thermal distortion of the imager array as the output signal of the blind pixels, and through common mode rejection (CMR) blocks the thermal distortion signal as well as fixed pattern noise generated by processing circuitry 10 from the output of the differential amplifier 60. The advantage of the blind pixel positioning of this embodiment is that line-to-line differences caused by process variations are cancelled by the amplifier 60 resulting in a more uniform signal.

In the exemplary embodiment the dynamic range of the array 5 decreases as the surrounding heat increases. In an alternative embodiment, the blind and active pixel signals can be first digitized by an analog to digital (A/D) converter of processing circuitry 10 (not shown), then the blind pixel offset can be subtracted from the digitized signals of the active pixels. Normalization of the active pixel signals to adjust their dynamic range is then by applied after subtraction.

The readout architecture allows the imager array 5 to be easily partitioned into N vertical sections with separate outputs, thereby making it possible to make design tradeoffs between improved readout noise level and more signal outputs.

A similar analysis can be performed for each pixel in each row, as the corresponding processing circuitry 10 is the same. Thus the description in operation of the first row having a first blind pixel (REF) is provided as representative of the general operation of each row and individual pixels therein of the imager array 5 (i.e., $x_{1-n}$ $y_{1-n}$). It is recognized by those skilled in the art that while the processing circuitry 10 is shown as scanning the array 5 row by row, alternative methods exist such as column by column scanning. As shown in FIG. 1A, it may be desirable to scan a first row of blind pixels, the blind pixel signal corresponding to each column would then be stored as a reference value.

The detailed operation of the imager array 5 and the processing circuit 10 is now described.

In non-selected rows of the imager array, the ROW_SELECT(Y) line 44 is low (e.g., 0 V) and the ROW_SEL_N(Y) line 42 is high (e.g., +5 V). This turns on the NMOS reset transistor 46 which clamps the common sensing node $V_G$ 25 between capacitors 30 and 32 to the reset potential $V_R$ 26. Transistor 46 is a minimum geometry device (e.g., W=1 μm and L=1 μm) which has a source-drain channel resistance of approximately 5 kΩ under these biased conditions. The ROW_SELECT(Y) line 44 is connected to the gates of the NMOS transistors 40 and 36 and turns both of these devices off. Transistor 40 is used to isolate the COL_READ(X) signal line 52 from the pixel PMOS source follower device 38. Transistor 36 is used to isolate the top plate of capacitor 30 from the COL_VA(X) line 20.

In selected rows of the imager array, the ROW_SELECT(Y) line 44 is high (e.g., +5V) and the ROW_SEL_N(Y) line 42 is taken low (e.g., 0V) low by the inverter 90. The ROW_SELECT(Y) line 44 is connected to the gates of the NMOS transistors 40 and 36 and turns both of these devices on. The COL_SELECT(1) line 54 of the first REF pixel switches to a high level for connecting the signal bus (BLIND OUT for blind pixels, PIXEL OUT for active pixels) and the load current source linked to the source follower 38 and COL_READ(X) line 52, of the first REF pixel. The source follower is only linked to the current mirror (on the COL_READ lines) when the row is selected and transistor 40 is turned on. The ROW_SELECT line 44, ROW_SELECT(1), remains high and the inverted row select line 42, ROW_SEL_N(1), remains low for an entire line time during which all the pixels in a row are read out as the COL_SELECT(X) line 54 of each pixel in the row is sequentially scanned.

The readout of signals from two pixels in a selected row is described with reference to FIGS. 2 and 3. At the beginning of the readout period, $t_1$, the column select line 54, COL_SELECT(1), of the first pixel, switches to a high level which connects the signal bus and the load current source linked to the source follower 38 and to the column read line 52, COL_READ(1), of the first pixel. The row select line 44, ROW_SELECT(1), remains high and the inverted row select line 42, ROW_SEL_N(1), remains low for an entire line time during which all the pixels in a row are read out.

As COL_SELECT(X) goes high the column driver circuit of processing circuit 10 multiplexes complimentary, bi-polar, pulsed bias waveforms $V_A$ and $V_B$ onto the selected column. Inverter 91 provides a logic low signal to transmission gates TA and TB to gate the signals $V_A$ and $V_B$ onto the COL_VA(X) and COL_VB(X) lines, respectively. The COL_SELECT(X) signal and inverter 91 turn on transistors 85 and 86 providing pulses $V_A$ and $V_B$ to the selected pixel.

More specifically, COL_VA(1) switches from low to high and COL_VB(1) switches from high to low. The transitions have relatively slow rise and fall times (about 50 ns) to limit the transient charge displacement current in the reference capacitors 32 located in unselected pixels on the same column. The complementary nature of the $V_A$ and $V_B$ pulses cancels the first order clock transient coupled onto the sensing node while providing a signal component proportional to the variation of the detector capacitor 30 (C1) of the form $dV_{out}=dC1*(V_A/CT)$ where CT is the total node capacitance of the sensing node (i.e., the combination of C1+C2). After a settling time of about 200 ns, the signal is sampled at time $t_3$ by the external CDS circuit (not shown) and the $V_A$ and $V_B$ pulses return to their respective original levels. The width of the $V_A$ and $V_B$ pulses is minimized in order to limit the mechanical motion induced in the detector capacitor top plate due to electrostatic attractive forces present during the sensing pulse.

After the signal for the first pixel has been sampled and processed by the CDS circuit, the signal for the second pixel is read out. At time $t_4$, the column select line 54 of the first pixel, COL_SELECT(1), switches low and the column select line 54 of the second pixel, COL_SELECT(2), switches high. At time $t_5$, the signals $V_A$ and $V_B$ are pulsed for the second pixel; namely, COL_VA(2) switches from low to high and COL_VB(2) switches from high to low. After a settling time of about 200 ns, the signal of the second pixel is sampled by the CDS circuit and the $V_A$ and $V_B$ pulses return to their respective original levels.

Referring now to FIG. 4 a further embodiment of the detector array will be described for averaging the blind pixel signals to account for signal non-uniformity and defective blind pixels.

FIG. 4 shows an imager array 5 having multiple first blind pixel columns, generally designated 70, and multiple second blind pixel columns, generally designated 75. In this embodiment, the blind pixel signals of the first columns and second columns are averaged by the processing circuitry 10 one row at a time. For example pixels A, B, C and D would be averaged along with pixels E, F, G and H to determine a first average blind pixel signal and a second average blind pixel signal. The two signals are then averaged to generate a final blind pixel signal for the row. This arrangement accounts for differences in heating from one side of the array to the other and also allows for defective blind pixels. It is recognized by those skilled in the art that any number of pixel columns can be provided, and that it may be preferable to utilize a single column on each side of the imager array 5 for maximizing the available imaging area of the array.

Alternatively, blind pixel rows and columns can be provided on all four sides of the array 5 for averaging both a column and row blind pixel signal. In this way, a pixel specific thermal distortion reference signal would be generated.

Figure 5:
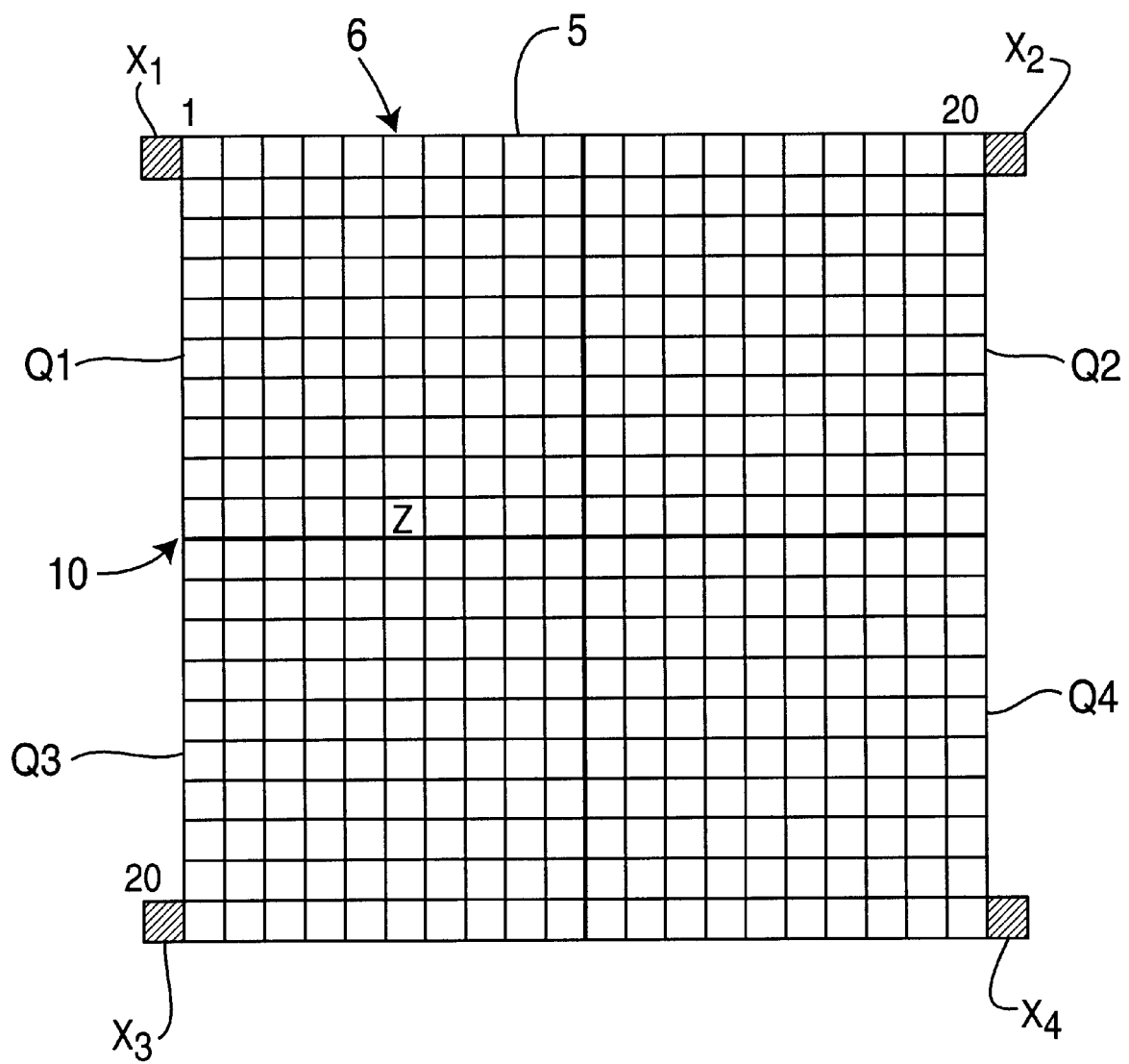
FIG. 5 is a block diagram of an embodiment of a detector array in accordance with the present invention.

In a further embodiment shown in FIG. 5, each corner of the array 5 employs a blind pixel (X1–X4) for outputting a reference output voltage signal. A thermal distortion signal then derived for a specific pixel in each row by weighting the output of X1–X4 relative to the location of the active pixel. For example, in FIG. 5, (Z) denotes a pixel in quadrant 1 (Q1) of FIG. 5 for which a thermal distortion value is desired.

$$Z_{OUT} = Z - \frac{14X_1 + 6X_2}{2(20)} - \frac{10X_1 + 10X_3}{2(20)}$$

where 6 is the column number and 10 is the row number and 20 is the number of total rows or columns. This weighted average includes a gradient for the thermal distortion across the image. A similar analysis would be performed for a pixel Z which is in quadrants Q2, Q3 or Q4 by utilizing the appropriate blind pixels X1–X4 (i.e., Q2 $X_1$, $X_2$, $X_3$; Q3 $X_1$, $X_3$, $X_4$; Q4 $X_2$, $X_3$, $X_4$). It is recognized by those skilled in the art that the above values and example are provided for illustrative purposes only, and that any number of rows or columns nay be utilized as desired.

As described above, in an embodiment which increases the dynamic range of the array 5, as surrounding heat increases, the blind and active pixel signals may be first digitized by an analog to digital converter, next the blind pixel offset can be subtracted from the digitized signals of the active pixels. Normalization of the active pixel signals would then by applied after subtraction.

It will be appreciated by those skilled in the art that changes could be made to the embodiments described above without departing from the broad inventive concept thereof. It is underestood, therefore, that this invention is not limited to the particular embodiments disclosed, but is intended to cover modifications within the scope of the following claims.

What is claimed is:

1. An infrared imager array including a monolithic semiconductor integrated circuit substrate for providing an image signal of a scene, comprising:

a first plurality of infrared sensors arranged in rows and columns each one of the plurality of infrared sensors having a deflectable microelectromechanical infrared radiation responsive element, for providing a proportionate electrical signal in response to infrared radiation of the scene incident thereto;

a second plurality of blind infrared sensors positioned along at least one side perimeter of the rows and columns, each one of the second plurality of infrared sensors having a deflectable micro-electromechanical infrared radiation responsive element, the infrared radiation responsive elements of the second plurality of blind infrared sensors being shielded from infrared radiation of the scene for providing a proportionate electrical signal in response to infrared radiation incident thereto, wherein a temperature gradient generated along the at least one side perimeter is sensed and converted to electrical signals by the second plurality of blind infrared sensors.

2. The semiconductor circuit of claim 1, wherein the at least one side perimeter is two side perimeters.

3. An infrared imager array according to claim 1, wherein the deflectable micromechanical infrared radiation responsive element of each of the first plurality of infrared sensors and the second plurality of blind infrared sensors is a deflectable micromechanical cantilever device.

4. An infrared imager according to claim 1, wherein:

the first plurality of infrared sensors are arranged in a matrix having a top side, a bottom side, a left side and a right side; and the second plurality of blind infrared sensors include at least first and second blind infrared sensors positioned adjacent to respectively different ones of the top side, bottom side, left side and right side of the matrix.

5. An infrared imager according to claim 4, wherein the at least first and second blind infrared sensors are positioned adjacent to the left side and the right side of the matrix, respectively.

6. An infrared imager according to claim 5, wherein:

the at least first and second blind infrared sensors include four blind infrared sensors ordinally numbered first through fourth;

the first blind infrared sensor is positioned adjacent to both the left side and the top side of the matrix;

the second blind infrared sensor is positioned adjacent to both the right side and the top side of the matrix;

the third blind infrared sensor is positioned adjacent to both the left side and the bottom side of the matrix; and the fourth blind infrared sensor is positioned adjacent to both the right side and the bottom side of the matrix.

7. An infrared imager according to claim 4, wherein the at least first and second blind infrared sensors are positioned adjacent to the top side and the bottom side of the matrix, respectively.

8. An infrared imager formed from a monolithic semiconductor integrated circuit substrate for sensing external infrared radiation, comprising:

a first plurality of infrared radiation detectors arranged in rows and columns, each one of the plurality of infrared radiation detectors providing a proportionate electrical signal in response to infrared radiation incident thereto; and a second plurality of blind infrared radiation detectors positioned along at least one side perimeter of the rows and columns, each one of the second plurality of infrared radiation detectors being shielded from the external infrared radiation for providing a proportionate electrical signal in response to infrared radiation incident thereto;

wherein a temperature gradient generated across at least one side perimeter is sensed and converted to electrical signals by the second plurality of blind infrared sensors.

9. An infrared imager array according to claim 8, wherein each of the first plurality of infrared radiation detectors and the second plurality of blind infrared radiation detectors is a deflectable micromechanical cantilever device.

10. An infrared imager according to claim 8, wherein:
the first plurality of infrared radiation detectors are arranged in a matrix having a top side, a bottom side, a left side and a right side; and
the second plurality of blind infrared radiation detectors include at least first and second blind infrared radiation detectors positioned adjacent to respectively different ones of the top side, bottom side, left side and right side of the matrix.

11. An infrared imager according to claim 10, wherein the at least first and second blind infrared radiation detectors are positioned adjacent to the left side and the right side of the matrix, respectively.

12. An infrared imager according to claim 11, wherein:
the at least first and second blind infrared radiation detectors include four blind infrared radiation detectors ordinally numbered first through fourth;
the first blind infrared radiation detector is positioned adjacent to both the left side and the top side of the matrix;
the second blind infrared radiation detector is positioned adjacent to both the right side and the top side of the matrix;
the third blind infrared radiation detector is positioned adjacent to both the left side and the bottom side of the matrix; and
the fourth blind infrared radiation detector is positioned adjacent to both the right side and the bottom side of the matrix.

13. An infrared imager according to claim 10, wherein the at least first and second blind infrared radiation detectors are positioned adjacent to the top side and the bottom side of the matrix, respectively.

* * * * *